Figure 1:
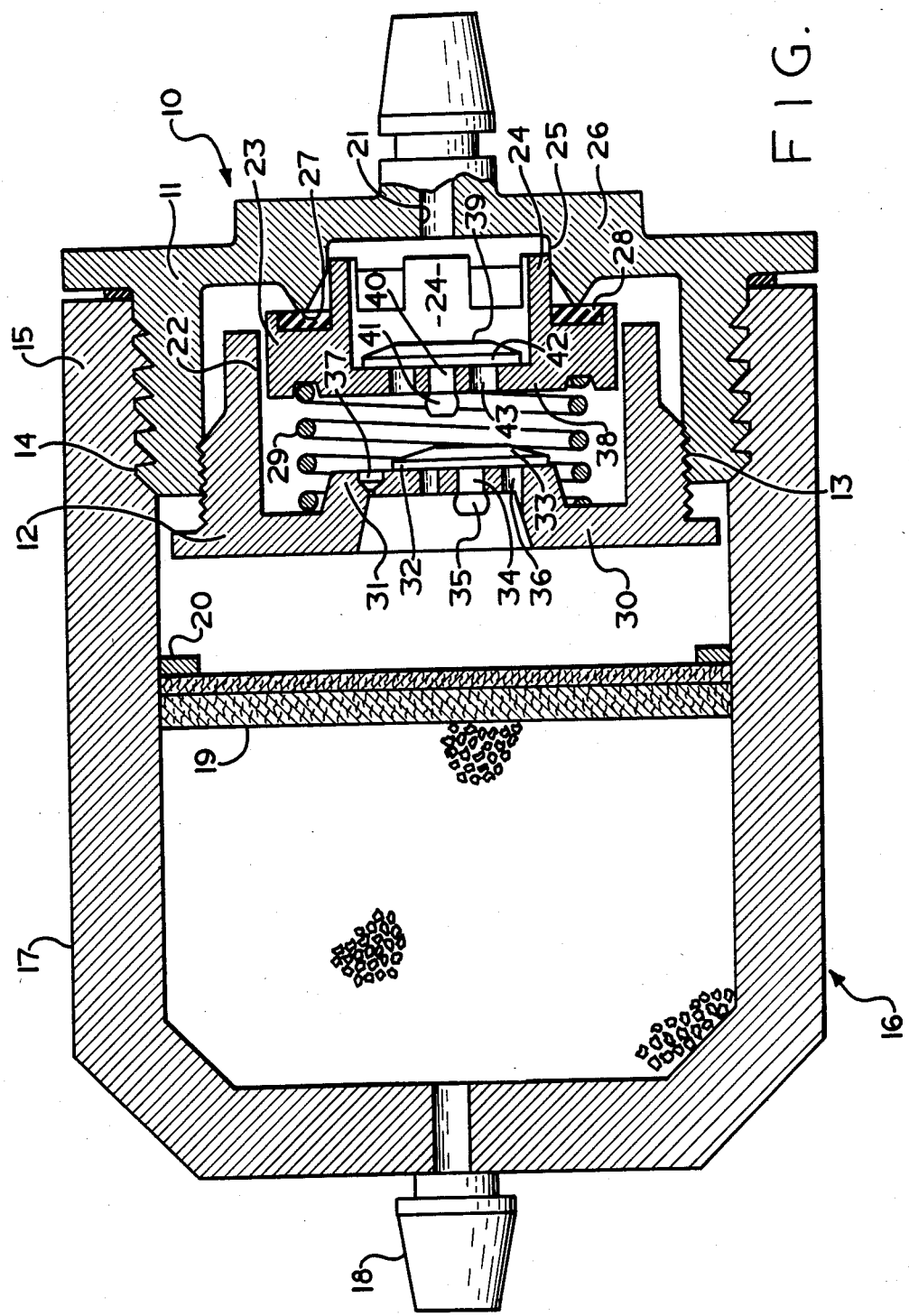

United States Patent [19]

Starr

[11] Patent Number: 4,664,141
[45] Date of Patent: May 12, 1987

[54] MINIMUM PRESSURE RETENTION VALVE

[75] Inventor: Keith E. Starr, Roxboro, N.C.

[73] Assignee: Eaton Corporation, Cleveland, Ohio

[21] Appl. No.: 794,353

[22] Filed: Nov. 1, 1985

[51] Int. Cl.$^4$ .............................................. F16K 17/26
[52] U.S. Cl. ............................. 137/493.2; 137/512.2;
137/513.7; 188/314; 267/64.28; 280/714; 280/DIG. 1
[58] Field of Search ............... 137/493.2, 512.2, 614.2,
137/513.7, 226, 493.1, 493.3, 493.4, 493.5,
493.6; 280/714, DIG. 1; 267/64.11, 64.28;
188/314

[56] References Cited

U.S. PATENT DOCUMENTS

| | | | |
|---|---|---|---|
| 2,323,237 | 6/1943 | Payne | 137/226 |
| 2,820,469 | 1/1958 | Seeler | 137/512.2 |
| 3,200,843 | 8/1965 | Jackson | 137/493.2 X |
| 3,604,450 | 9/1971 | Botkin | 137/493.4 |
| 4,010,721 | 3/1977 | Ludwig | 137/493.2 X |
| 4,040,404 | 8/1977 | Tagawa | 137/493.2 X |
| 4,046,163 | 9/1977 | Novak | 137/614.2 X |
| 4,241,751 | 12/1980 | Nonoyama et al. | 137/513.7 X |
| 4,458,711 | 7/1984 | Flider | 137/493.2 X |
| 4,504,081 | 3/1985 | Shimizu et al. | 280/714 |
| 4,570,972 | 2/1986 | Pangos | 280/714 |

FOREIGN PATENT DOCUMENTS 1252988 10/1967 Fed. Rep. of Germany ...... 137/226

Primary Examiner—Martin P. Schwadron
Assistant Examiner—Stephen M. Hepperle
Attorney, Agent, or Firm—D. A. Rowe; C. J. Toddy

[57] ABSTRACT

A minimum pressure retention valve which is adapted to be connected in the air circuit of a vehicle load leveler system, and wherein the minimum set pressure is easily and reliably adjusted and the valve permits rapid pressurization of the load leveler system while retaining the set pressure when the air supply is off.

7 Claims, 1 Drawing Figure

MINIMUM PRESSURE RETENTION VALVE

This invention relates to a minimum pressure retention valve for vehicle load leveler systems. More particularly, the invention relates to a pressure retention valve which will retain a predetermined and adjustable set minimum pressure in a vehicle load leveler system.

Such systems include one or more pairs of air shocks supporting the vehicle body relative to the chassis and an air pressure circuit and controls for supplying pressurized air to the air shocks and periodically varying the air pressure in the air shocks in response to a variation in loads on the vehicle body. The load leveling system functions to maintain the vehicle body in a more or less level position relative to the chassis.

The air circuit to such system includes a system air supply, such as a compressor, to supply pressurized air. The air circuit also includes an air retention valve which may conveniently be assembled to an air dryer which must also be included in the air circuit. The retention valve permits the air shocks to be filled, and is adjustable to maintain a predetermined set minimum pressure on the system.

An object of the present invention is to provide a minimum air pressure retention valve for retaining a set pressure when the air pressure supply to the valve is off.

A further object of the present invention is to provide a minimum pressure retention valve of the character described which is reliable and is economical to produce.

Another object of the invention is to provide a minimum pressure retention valve having a back flow restriction which is simple and yet reliable.

Other objects and advantages of the invention will be apparent from the following description when considered in connection with the accompanying drawing, wherein FIG. 1 is a cross-sectional view of the valve of this invention.

Referring to FIG. 1, there is illustrated a retention valve, designated generally by the numeral 10 comprising a generally cylindrical body member 11 and a generally cylindrical body member 12 threadedly received in the body member 11, by threads 13.

The body member 11, of retention valve 10, is threadedly received by threads 14 into the end 15 of an air dryer 16 which is included in the air circuit of a vehicle load leveler system (not shown). The air dryer 16 comprises a generally cylindrical body 17 having an inlet 18 connected to a compressor or other source of air pressure. The dryer body 17 is hollow and filled with a suitable air drying agent such as silica gel which is retained therein by one or more filters 19 and a retainer 20. The filters 19 and retainer 20 are spaced from the adjacent face of the body member 12. Thus, pressurized air enters the air dryer 16 through the inlet 18 and is dryed and filtered as it passes through the air dryer and before passage through the retention valve 10 to the outlet orifice 21 which is connected to the air circuit supplying the air shocks of the vehicle.

The cylindrical body member 12 is provided with a cylindrical inner wall 22 having a diameter slightly larger than the diameter of the piston member 23 which is positioned therein. The piston member 23 has a series of axially extending spaced projections 24 adapted to slideably engage the cylindrical wall 25 formed in the end 26 of the body member 11. The end wall 26 is provided with an annular projecting valve seat 27 engaged by a ring shaped rubber or plastic valve seat 28 mounted on the piston 23. A compression spring 29 is positioned between the piston member 23 and the end wall 30 of the body member 12 to bias the piston member to apply an axially force to close the piston valve 23. End wall 30 of the body member 12 is provided with an annular projection 31 extending axially towards the piston member 23 which is surrounded by one end of the spring 29.

A rubber or plastic T-shaped check valve 32 having a dish shaped head 33 and a stem 34 which extends through a hole in the projection 31. The stem 34 has an enlarged end 35 which retains the valve in position. The head 33 of the check valve 32 covers a plurality of spaced holes 36 which extend through the projection 31. Thus the check valve 32 permits pressurized air to flow through the holes 36 in a direction towards the outlet orifice 21, but prevents pressurized air from flowing in an opposite direction. A bleed orifice 37 is also provided in the projection 31 adjacent the check valve 32.

The face 38 of the piston member 23 is also provided with a rubber or plastic T-shaped check valve 39 of a construction similar to the check valve 32. The stem 40 extends through a hole in the face 38 and has an enlarged end 41 which retains the valve 39 in position. The head 42 of the valve 39 covers a plurality of spaced holes 43 extending through the face 38. Thus, the check valve 39 permits pressurized air to flow through the holes 43 in a direction towards the outlet orifice 21, but prevents pressurized air from flowing in an opposite direction.

When initially filling or pressurizing the air shocks of the vehicle leveler system, it is seen that pressurized air from the system air supply or compressor passes through the inlet 18 through the dryer 17 where the air is dried, then through the filters 19 and hence through the retention valve 10 to the outlet 21 connected to the air circuit of the vehicle leveler system. As is apparent, the check valves 32 and 39 do not impede the pressurized air and the air system may be initially pressurized generally to a pressure between 8 and 100 PSI. The air circuit includes a control for controlling air pressure upstream from the outlet orifice 21 so that the pressure in the air shocks may be adjusted and thus level the vehicle in response to a variation in load on the vehicle body.

The function of the retention valve 10 is to maintain an adjustable minimum air pressure or set minimum pressure when the air pressure supply to the air circuit is off. The minimum said pressure is adjusted by adjusting the position of the body member 12 relative to the body member 11 to increase or decrease the bias of the spring 29 which, of course, biases the piston valve member 23 against the valve seat 27. Assuming that the member 12 has been adjusted relative to the member 11 so that the set pressure is set at a pressure between 8 PSI and 20 PSI, and the control in the air circuit for adjusting the level of the vehicle body is opened to permit the system pressure to enter the orifice 21, pressure acting against the piston member 23 will unseat the valve from the valve seat 27 and allow the pressure to bleed down through the valve 10 by passing between the piston member 23 through the clearance between the piston 23 and the wall 38 and through the bleed orifice 37. Air will continue to bleed down from the piston until the back pressure equals the set pressure at which point the spring 29 will close the piston 23 and maintain the minimum set pressure on the system.

The bleed orifice 37, of course, controls the bleed down rate so that there is a time lag before the set pressure is attained. Of course, when the compressor is restarted, air will initially repressurize the system to its operating pressure.

While one body of the invention has been shown and described in detail it will be understood that this is illustrative only and is not to be taken as a definition of the scope of the invention, reference being had for this purpose to the appended claims.

I claim:

1. A minimum pressure retention valve for the air circuit of a vehicle load leveler system comprising a body having first and second members threadedly connected together, said first member having an inlet orifice and said second member having an outlet orifice for pressurized air;

an annular valve seat formed on said second member adjacent said outlet orifice;

a piston member movable between a closed position in engagement with said valve seat and an opened position out of engagement with said velve seat;

spring means positioned between said first member and said piston for biasing said piston member against said valve seat at a set minimum pressure predetermined by adjusting said first and second members relative to each other;

said first member and said piston each having an air operated check valve mounted theron to permit pressurized air to pass through said retention valve from the inlet orifice to the outlet orifice but prevent passage in the opposite direction, said first member having a bleed orifice to permit pressurized air to pass to said inlet orifice when said piston member is in said opened position, whereby when the pressure at the valve outlet reaches the set minimum pressure, the piston member closes and is maintained in closed position until the pressure at the valve outlet exceeds the set minimum pressure.

2. A valve as claimed in claim 1 in which an axially extending wall is formed on said first member radially inwardly of said valve seat and projection means are formed on said piston member which slidably engage said wall.

3. A valve as claimed as claim 2 in which said projection means includes a plurality of slots through which air may pass to or from said outlet and around said valve seat.

4. A valve as claimed in claim 1 in which the outer periphery of said piston member is privided with means for permitting air to pass between said piston and an adjacent wall of said first member and hence through said bleed orifice.

5. A valve as claimed in claim 1 which said check valves are T-shaped in cross section, made of flexible elastomeric material, and have a disc shaped portion which respectively cover one or more holes respectively through said piston and said one member.

6. A valve as claimed in claim 5 in which said check valves are each provided with a stem extending through a hole respectively in said first member and said piston, each stem having a head for retaining the check valve therein.

7. A valve as claimed in claim 1 in which the outer periphery of said body is provided with means for securing the valve in sealing relationship to an air dryer upstream from said inlet orifice.

* * * * *